United States Patent Office 2,803,083
Patented Aug. 20, 1957

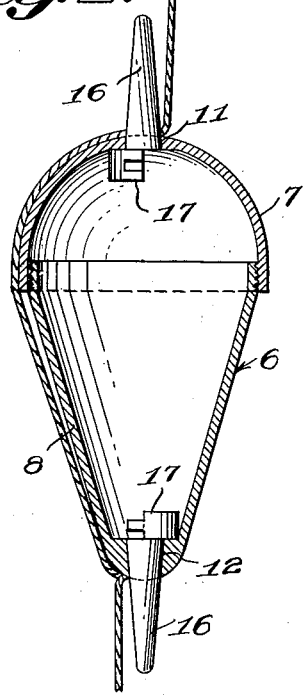
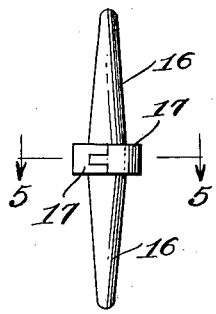
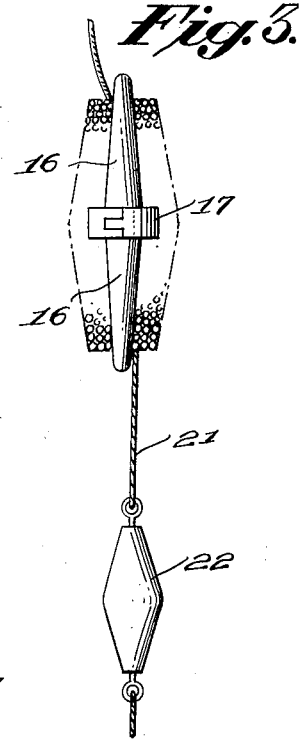
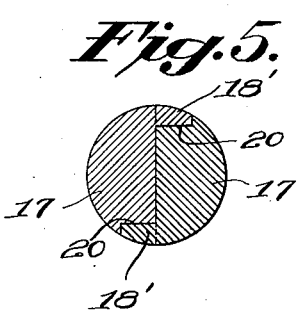
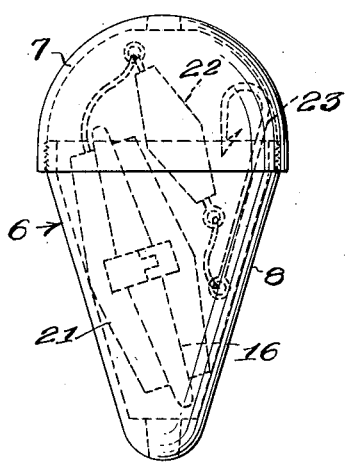
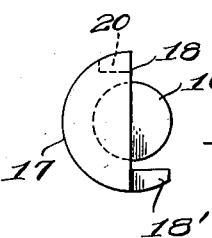

2,803,083

FISHING TACKLES

David Pelton Moore, Marlow, N. H.

Application September 9, 1955, Serial No. 533,385

4 Claims. (Cl. 43—44.93)

This invention relates to improvements in fishing tackles, and more particularly to a float or bob, with line, hook and sinker, and which when not in use in fishing, forms a container for such line, hook and sinker.

One object of the invention is the provision of a float or bob made of a light material, either aluminum, a plastic such as acetate, polyethylene, polystyrene, or the like, and so constructed as to provide a hollow body formed from two readily separable members or sections so as to permit the introduction of the fishing line with its sinker and hook for storage, whereby the complete article in the form of a ventilated container, can be placed in the pocket of a user, or in the glove compartment of a motor car without danger of the line and hook becoming entangled and hooked to anything, such as a suit or upholstery.

Still another object of the invention is the provision of a bob or float having a novel form of reel and line connecting means, and wherein the same is composed of two pins, similar in contour and which have portions providing a base that forms limiting means when the pins are used as a line connecting device and when the two pins are interengaged forms a reel for the fishing line, while the limiting portions of the pins form a central connection.

Still another object of the invention is the provision of a hollow float body formed from two sections, each of the sections being provided with an aperture to provide ventilating and air admitting means so that a wet line may be wound upon the reel and inserted in the float body to dry therein, said apertures also acting as a means to receive and attach the respective line attaching pins so that the float body may be connected to the line, and whereby the length of the pins when interengaged are shorter than the extreme length of the hollow of the float body to permit the complete reel with line, hook and sinker to be readily fitted into the assembled float body.

In the accompanying drawings:

Figure 1 is a view in elevation of the present float when used as a tackle container, the dotted lines illustrating the position of the tackle therein.

Figure 2 is a vertical central sectional view through the float or bob with the line attaching pins in place and the line attached thereto.

Figure 3 is a plan view of the two reel forming pins attached together and with a line wound thereon and a hook and sinker connected thereto previous to placing the same in the hollow body of the float or bob.

Figure 4 is an enlarged view of the two pins showing the detailed connections therebetween.

Figure 5 is a section on line 5—5 of Fig. 4.

Figure 6 is a butt end view of one of the pins.

Referring to the drawings, the numeral 6 designates a bob or float body, which is made in two sections or members 7 and 8, such sections having a screw threaded or slip joint to form a water-tight joint. However, the sections may be connected by a bayonet-and-slot joint or a half-turn joint. Each section 7 and 8 is provided respectively with an opening or aperture 11 and 12, to receive from the inside, its respective pin 16. Each of the pins are identical and can be molded in the same plastic mold, and each has a base portion with a flat face 18 provided with a slot 20, and a projection or lug 18'. As these bases are counterparts they can readily be assembled by engaging the lug 18' of each base portion in the oppositely disposed recess 20 and the line 21 wound thereupon so that the entire reel formed by these assembled pins can be placed in one section of the float or bob body and then closed in by slipping on the other section, as in Fig. 1.

It will be noted that when the two pins 16 are connected as in Figs. 1 and 4, their length is such as to be less than the length of the hollow portions of the two members 7 and 8, so that the complete reel, line, hook and sinker are neatly enclosed within the float body.

It will be noted that the apertures 11 and 12 are slightly tapered, so that the pins when separated can be inserted from within, and pushed so that the pins seal the apertures water-tight and the base engages the inner adjacent portion of the sections or members 7 and 8, providing the line engaging projecting pins, as shown in Fig. 2.

What is claimed, is:

1. A fishing tackle including a body formed from two separable sections, a line attaching pin removably attached to each of said sections, said pins having interengageable means adapted to join the pins to form a reel upon which a fishing line can be wound when said pins are removed from line attaching position on said body.

2. A fishing tackle comprising a hollow float body formed from two separable members, each of said members having an opening therein, a line attaching pin adapted to be detachably inserted in each of said openings for securing a fish line to said body, each of said pins having abutment means for engaging the inner surface of each of said body members adjacent said openings to prevent withdrawal of said pins outwardly therefrom and for joining said pins together to form a line reel when said pins are removed from line attaching position on said body members whereby the line can be wound thereon and encased within the hollow float body.

3. A fishing tackle as set forth in claim 2 in which said line attaching pins have an enlarged tapered portion adapted to frictionally engage the walls of the openings in said body and said abutment means includes an enlarged base portion on each of said pins.

4. A fishing tackle as set forth in claim 3 in which said float body members are cupped-shaped and constitute the top and bottom thereof and said enlarged base portion of each of said pins is semi-circular, the diametrical face of each semi-circular portion being provided with a projecting lug and a recess, the lug on each of said face portions being adapted to be detachably received by the oppositely disposed recess in each of said face portions, whereby the pins may be joined to provide an elongated reel.

References Cited in the file of this patent

UNITED STATES PATENTS

| | | |
|---|---|---|
| 395,900 | Hayes et al. | Jan. 8, 1889 |
| 842,540 | Fleming | Jan. 29, 1907 |
| 2,501,230 | McHan | Mar. 21, 1950 |